(12) United States Patent
Anderson et al.

(10) Patent No.: US 7,549,654 B2
(45) Date of Patent: Jun. 23, 2009

(54) WHEEL-MOUNTED WIRE RACK SYSTEM FOR SHIPPING, STORAGE, AND DELIVERY

(75) Inventors: Kent D. Anderson, East Longmeadow, MA (US); Daniel Neely, Reading, PA (US)

(73) Assignee: Unifirst Corporation, Springfield, MA (US)

(*) Notice: Subject to any disclaimer, the term of this patent is extended or adjusted under 35 U.S.C. 154(b) by 1018 days.

(21) Appl. No.: 10/442,316

(22) Filed: May 20, 2003

(65) Prior Publication Data

US 2003/0218307 A1 Nov. 27, 2003

Related U.S. Application Data

(60) Provisional application No. 60/382,797, filed on May 22, 2002.

(51) Int. Cl.
*B62B 3/00* (2006.01)
(52) U.S. Cl. ................ 280/47.34; 280/79.11; 211/85.24
(58) Field of Classification Search ................ 211/85.3, 211/85.7, 85.8, 71.01, 85.24, 133.2; 248/129; 280/47.34, 79.11
See application file for complete search history.

(56) References Cited

U.S. PATENT DOCUMENTS

| | | | | |
|---|---|---|---|---|
| 1,343,423 A | * | 6/1920 | Todd | ............................ 40/657 |
| 1,572,971 A | * | 2/1926 | Syers | ........................... 211/12 |
| 1,804,997 A | | 5/1931 | Manley | |
| 2,454,858 A | | 11/1948 | Burt | |
| 2,625,973 A | | 1/1953 | Weldon et al. | |
| 2,726,913 A | | 12/1955 | Freeman | |
| 2,882,032 A | | 4/1959 | Garner | |
| 3,007,708 A | | 11/1961 | Ochs | |
| 3,064,992 A | | 11/1962 | Hoof | |
| 3,218,090 A | | 11/1965 | Herman | |
| 3,873,114 A | | 3/1975 | Brown | |
| 3,874,302 A | * | 4/1975 | Crosswhite | .............. 104/172.3 |
| 3,920,260 A | | 11/1975 | Downing | |
| 3,994,684 A | * | 11/1976 | Tomasulo | .................... 422/297 |
| 4,403,701 A | * | 9/1983 | Corcoran | .................. 211/133.1 |
| 4,670,227 A | * | 6/1987 | Smith | ......................... 422/297 |
| 4,958,841 A | | 9/1990 | Keen | |
| 4,986,555 A | | 1/1991 | Andreen | |
| 5,040,690 A | * | 8/1991 | van der Schoot | ............ 211/135 |
| 5,118,173 A | * | 6/1992 | Proctor et al. | ................ 312/213 |
| 5,294,009 A | * | 3/1994 | Maurer et al. | .......... 211/126.15 |

(Continued)

*Primary Examiner*—Christopher P Ellis
*Assistant Examiner*—Brian Swenson
(74) *Attorney, Agent, or Firm*—Holland & Bonzagni, P.C.; Donald S. Holland, Esq.

(57) ABSTRACT

A wheel-mounted, heavy-duty wire rack system for shipping, storage, and delivery of environmental suits and other garments includes a multi-shelf wire rack mounted on a sturdy wheeled base. The base is a steel frame with four casters and a pair of forklift guides attached to the underside of the frame. The multi-shelf wire rack is attached to the topside of the frame, and includes four upright posts and a plurality of reinforced wire shelves attached to and extending between the posts. Further, a set of wire mesh panels is attached to the posts and shelves to enclose the sides of the wire rack, thereby forming a single front opening for each shelf. Fabric covers are positioned over the multi-shelf wire rack for preventing items from falling out during shipping and handling. Additionally, fabric shelf dividers or bins are positioned on the shelves for storage and organization of smaller items.

2 Claims, 4 Drawing Sheets

U.S. PATENT DOCUMENTS

| | | |
|---|---|---|
| 5,564,723 A | 10/1996 | Breeden et al. |
| 5,967,342 A * | 10/1999 | Steffine .................. 211/85.24 |
| 6,032,965 A | 3/2000 | Sabounjian |
| 6,135,706 A | 10/2000 | Marti et al. |
| 6,867,393 B1 * | 3/2005 | Lewis ........................ 219/401 |
| 2002/0005389 A1 * | 1/2002 | Guo ........................... 211/85.3 |

* cited by examiner

WHEEL-MOUNTED WIRE RACK SYSTEM FOR SHIPPING, STORAGE, AND DELIVERY

This application claims priority from a Provisional Application, Serial No. 60/382,797, filed May 22, 2002.

FIELD OF THE INVENTION

The present invention relates to devices for shipping, storing, and delivering garments and similar items.

BACKGROUND

Many industries utilize plastic (i.e., synthetic material) environmental body suits, which are worn by workers for protection from hostile environments and/or substances, or for reducing contamination from the workers themselves in "clean rooms." As such, the exteriors of such suits oftentimes become tainted from workplace contaminants. Additionally, because such suits are largely self-contained and closed to the outside environment when worn, and because the synthetic materials used to make the suits do not "breathe" or absorb liquids to much of an extent, the suits tend to become interiorly soiled from human sweat and grime. Accordingly, the suits have to be both washed and dried on the inside and outside after use.

The process of cleaning environmental suits and other garments can be quite lengthy and circuitous. For example, at an industrial site (nuclear facility, laboratory, factory, etc.), once the suits have been worn or have become otherwise soiled, they are removed by workers in a changing area. From the changing area, the suits are bundled together in bags. Then, the bags of suits are somehow transported to a cleaning or laundering facility, which may involve loading the bags onto trucks for transportation to a remote site. Once at the cleaning facility, the bags are opened, the suits and other garments are sorted, washed, dried, and otherwise processed, and are then re-bagged, loaded back onto trucks and transported back to the facility. Once back at the facility, the clean suits have to be lugged back to the changing area, sorted (if needed), and unpacked onto shelves for storage and later use by workers. As should be appreciated, all this packing/unpacking and loading/unloading can take a considerable amount of effort, especially if much of the process is done by hand. Furthermore, even if wheeled racks or bins are used to aid in the process, they are typically not sturdy enough to stand up to heavy industrial applications and truck shipping.

Accordingly, it is a primary object of the present invention to provide a mobile rack that can be used to both transport soiled garments, and to transport and store sorted, clean garments.

Another primary object of the present invention is to provide a mobile rack that is optimized for transporting soiled garments from an industrial plant to a remote cleaning or laundering facility via truck, and for transporting clean, sorted garments from the remote cleaning facility back to the industrial plant.

Another object of the present invention is to provide a mobile rack that is particularly well-suited for heavy industrial use and for truck shipping.

SUMMARY

A wheel-mounted, heavy-duty wire rack system or cart for shipping, storage, and delivery of environmental suits and other garments comprises a multi-shelf wire rack mounted on a sturdy, wheeled, forklift-accessible base. In addition to the rack and base, the system includes various optional fabric covers and dividers to aid in shipping, organization, and identification of shelved items.

The base of the wire rack system is a rectangular, steel frame with four heavy-duty casters and a pair of forklift channels or guides attached to the underside of the frame. The multi-shelf wire rack is attached to the topside of the frame, and includes four upright posts (one at each corner of the frame) and a plurality of generally-parallel, reinforced wire shelves attached to and extending between the posts. Further, a wire mesh matrix (i.e., set of panels) is attached to the posts and/or shelves to enclose the rear side and two end sides of the wire rack, thereby forming a single fore opening for each shelf.

At least one fabric cover is positioned over the multi-shelf wire rack for preventing items from falling out during shipping and handling. Additionally, fabric shelf dividers or bins are positioned on the shelves for storage and organization of smaller items.

For using the wire rack cart, at a cleaning or laundering facility, laundered garments are placed on the shelves, and/or in the bins or between the shelf dividers. The fabric cover is closed to keep the garments in place during shipping. Subsequently, the wire rack system is wheeled or lifted into a truck and transported to an industrial site, where it is removed from the truck and wheeled to a changing area. There, the fabric cover is opened, revealing the contents, which are left in place until removed for use by workers—in effect, the wire rack system acts as a set of storage shelves. When empty, soiled garments are placed back on the cart, the cover is closed, and the cart is wheeled back to a truck for transportation back to the cleaning facility, where the garments are laundered.

BRIEF DESCRIPTION OF THE DRAWINGS

These and other features, aspects, and advantages of the present invention will become better understood with respect to the following description, appended claims, and accompanying drawings, in which:

DETAILED DESCRIPTION

Figure 1:
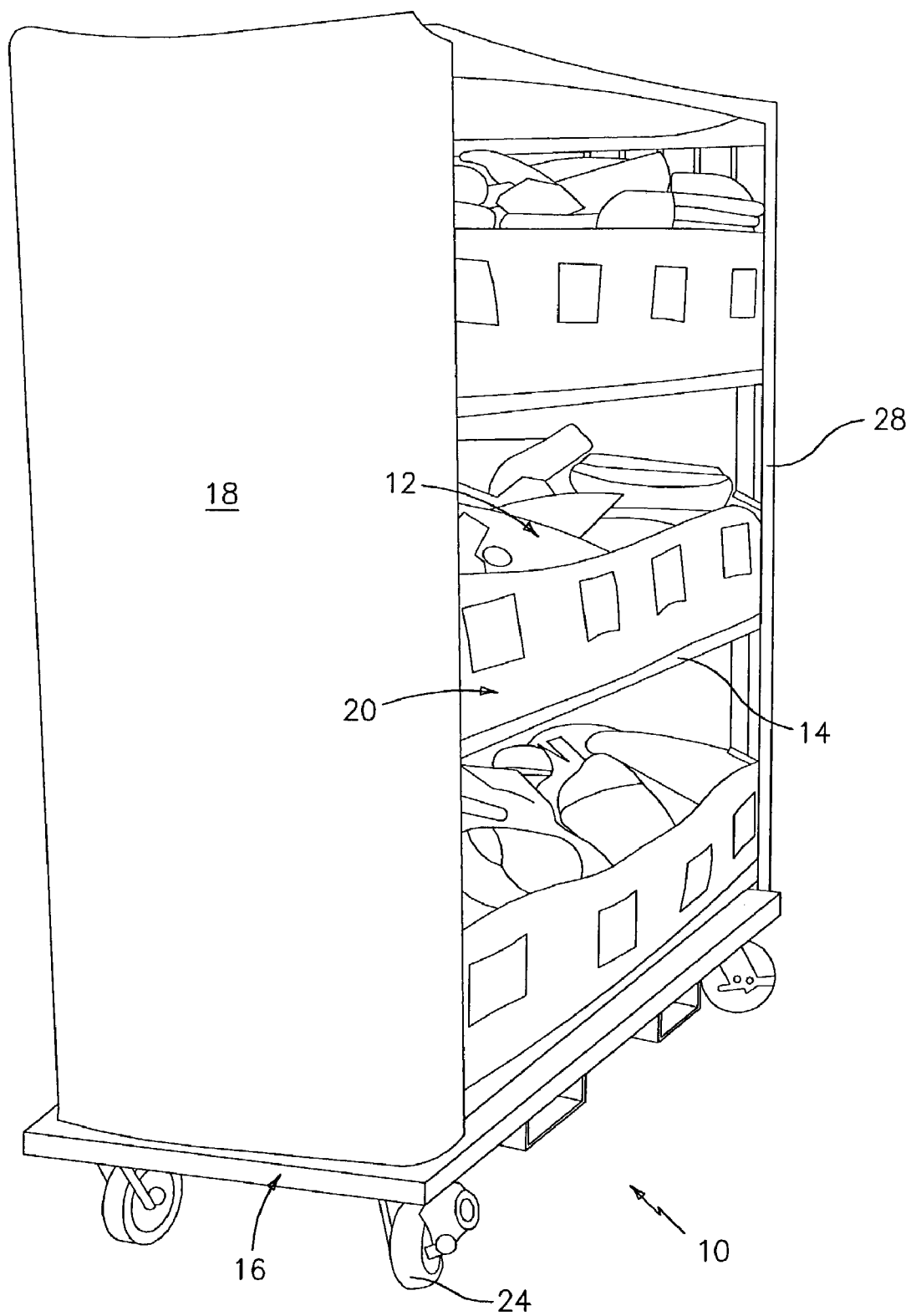
FIG. 1 is a perspective view of a wheel-mounted, heavy-duty wire rack system or cart for shipping, storage, and delivery of environmental suits and other garments, according to the present invention.
Figure 4:
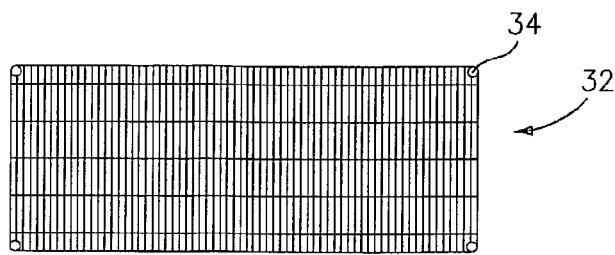
FIG. 4 is a plan view of a shelf component portion of the wire rack system.

Turning now to FIGS. 1-8, a wheel-mounted, heavy-duty wire rack system or cart 10 for shipping, storage, and delivery of environmental suits and other garments 12 comprises a multi-shelf wire rack 14 mounted on a sturdy, wheeled, forklift-accessible base 16. In addition to the rack 14 and base 16, the system includes various fabric covers 18 and dividers 20 to aid in shipping, organization, and identification of shelved items.

Figure 2A:
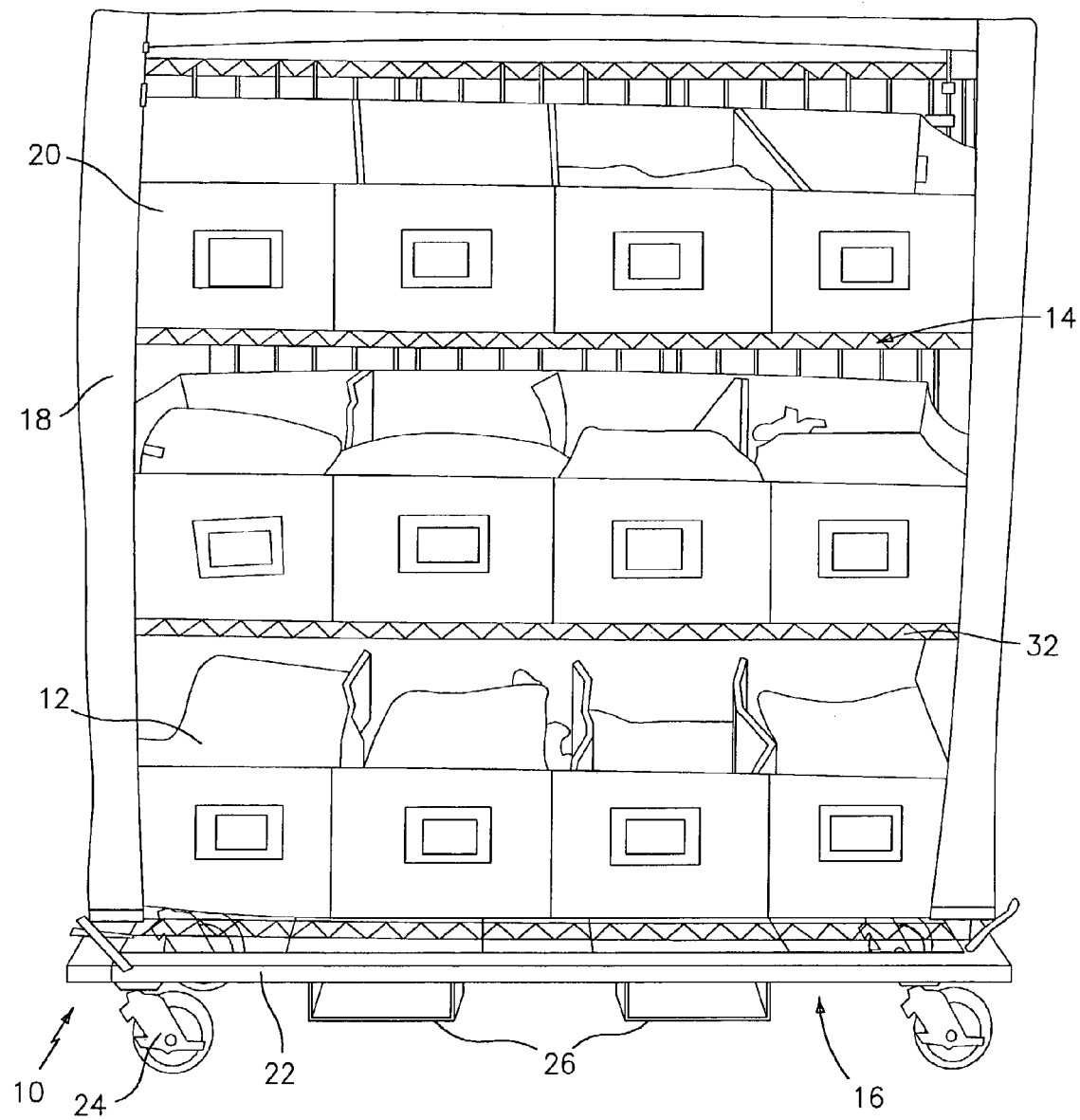
FIGS. 2A & 2B are front elevation views of the wire rack system.
Figure 2B:
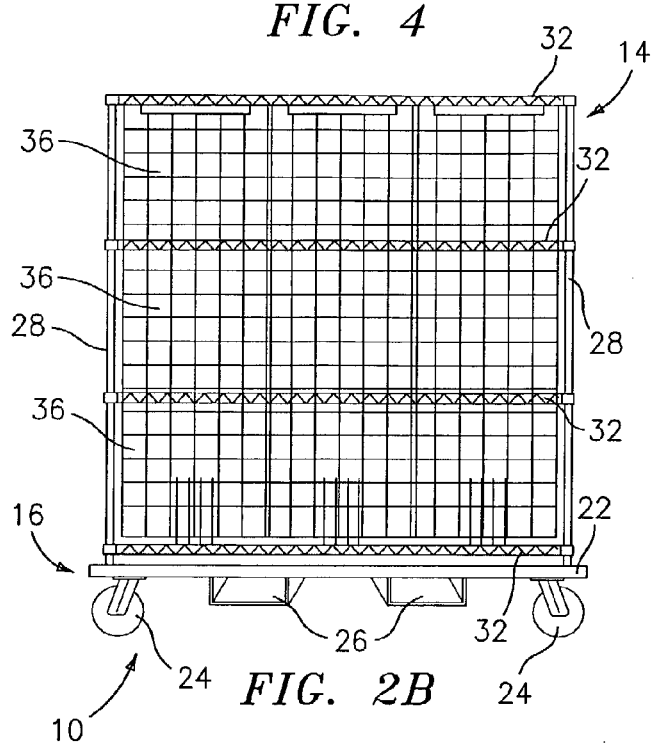
Figure 5:
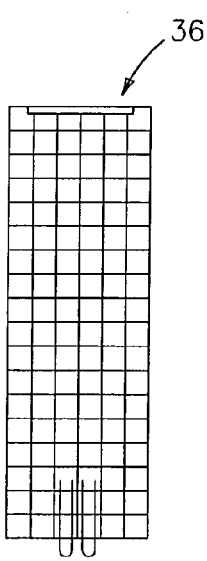
FIG. 5 is a plan view of a wire mesh matrix (side and back panel) portion of the wire rack system.
Figure 3:
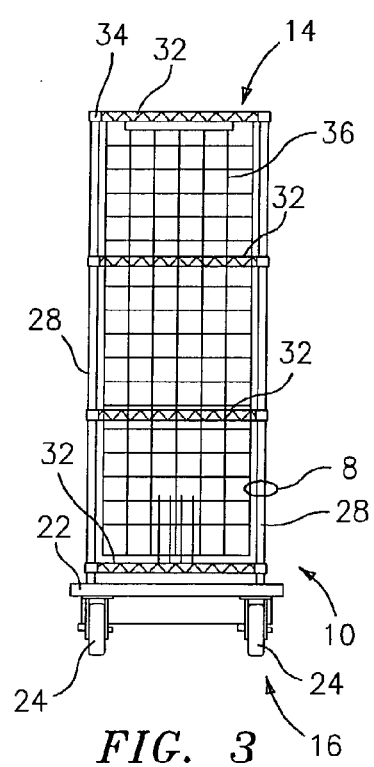
FIG. 3 is a side elevation view of the wire rack system.
Figure 6:
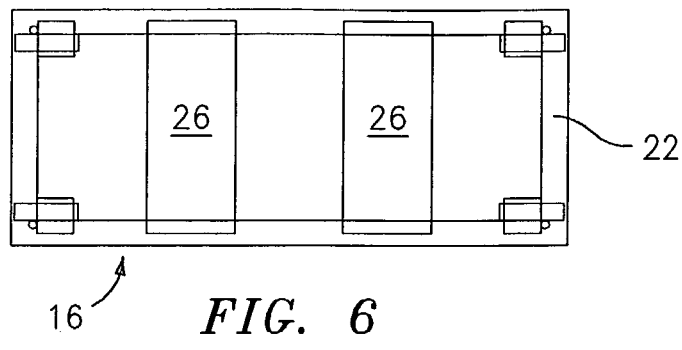
FIG. 6 is a plan view of a base portion of the wire rack system.
Figure 7:
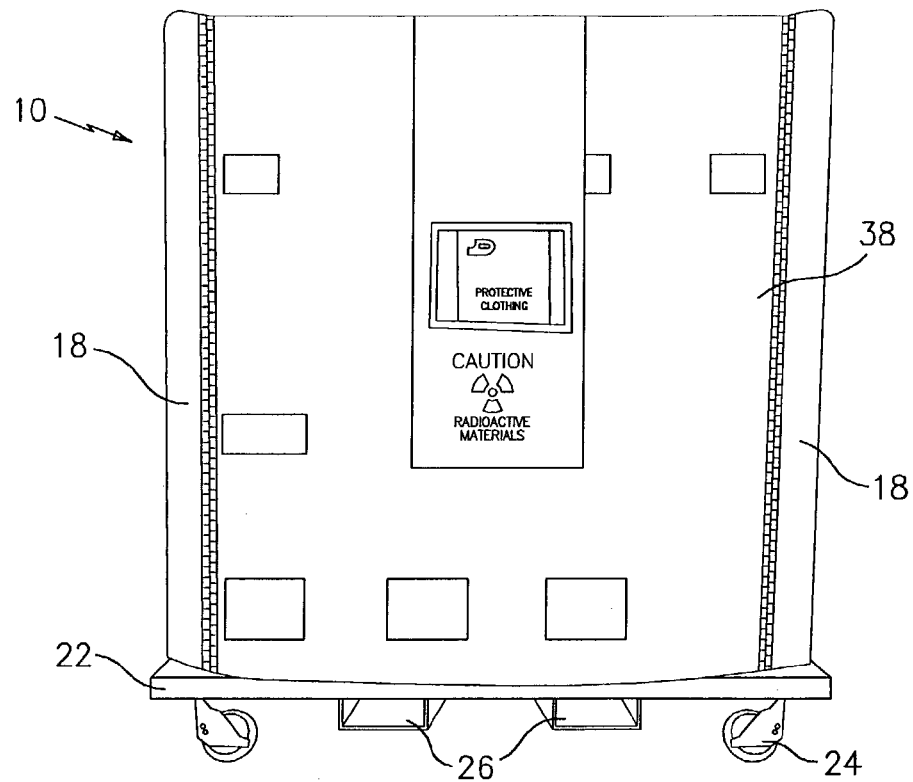
FIG. 7 is a front elevation view of the wire rack system with a zippered front panel portion in a closed position.
Figure 8:
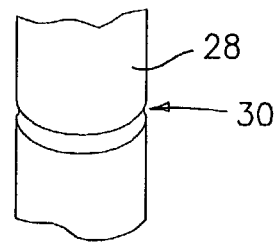
FIG. 8 is a perspective detail view of a portion of FIG. 3.

FIGS. 2B, 3, and 6 best show the base 16. The base 16 comprises a rectangular, steel frame 22 made from 1.5"×3" box carbon steel (or other sturdy material), which is dimensioned to fit through a standard doorway (e.g., the frame is about 2.5' wide). Four heavy-duty casters 24 are connected to the underside of the steel frame 22, one at each of the frame's four corners. The casters 24 swivel 360° and lock at ninety degree positions, and include lockable brakes (not shown) to prevent rolling. Additionally, two forklift channels or guides 26, made of $\frac{1}{32}$" sheet metal, are attached in parallel to the underside of the steel frame 22. These allow the wire rack cart 10 to be safely lifted by a forklift or other lift truck.

As should be appreciated, having the casters and multi-shelf rack attached to the steel base frame, instead of having casters attached directly to a multi-shelf rack, greatly increases the strength and durability of the present invention over previous wheeled carts.

The multi-shelf wire rack 14 is attached to the topside of the frame 22, and includes four upright posts 28 respectively attached to the topside of each corner of the frame 22. The posts are made of stainless steel (or another appropriate material) and are typically 1" by 4', depending on the desired height of the wire rack system. Each post 28 is inscribed with circular detent rings 30 (i.e., circumferential indentations) at one-inch intervals along its length. Four generally-parallel shelves 32 are attached to the posts 28: one at the bottom against the base 22, two at intermediate positions, and one at the top of the posts. Each shelf is made of reinforced, chrome-plated wire, and includes four corner brackets 34 or circular openings through which the posts 28 are passed. The shelves 32 can be set at any height, with the detent rings 30 machined into the posts 28 helping to keep the shelves locked in place (i.e., the corner brackets 34 engage the detent rings 30). Additionally, a plurality of wire panels or matrices 36 (see FIG. 5) are attached to the sides and back of the wire rack system 10. These enclose the sides and rear of the shelves, whereby the shelves are accessible only through front or fore openings. The wire panels 36 are attached to the shelves, posts, and/or base via standard clamps or other attachment mechanisms.

For preventing items from falling out during shipping, the fabric covers 18 are positioned over the multi-shelf wire rack to cover the sides, top, and back of the wire rack. The fabric covers 18 are made of tear-resistant, heavy-duty nylon or another suitable material. Additionally, one or more zippered front panels 38 (see FIG. 7) are provided for covering the front shelf openings when the rack unit 10 is moved or shipped. This prevents items from falling out the front of the unit. To access the interior of the unit, the zippered front panel(s) 38 is simply unzipped, and can be flipped up out of the way over the top of the unit. Additionally, the fabric shelf dividers or bins 20 may be attached to the shelves 32 for storing and organizing smaller items. The covers and shelf dividers are both removable and machine washable for ease of decontamination and cleaning.

In use, the wire rack system holds garments during both storage and shipping, eliminating the need to unpack clean garments for storage, and streamlining the shipping process. For example, starting at an industrial facility or other workplace, soiled garments are placed on the shelves of an empty wire rack cart 10 at the facility's changing location. Once the rack is full, the zippered front panel is closed and zippered shut, keeping the contents securely inside. Subsequently, the rack is wheeled by hand to a shipping location. As should be appreciated, since the rack is no wider than a standard doorway, no special accommodations have to be made. Once at the shipping location, the rack is either rolled onto a truck or lifted via a forklift, as facilitated by the forklift guides 26. Since the rack offers an efficient use of vertical space, numerous racks can be loaded on the truck, facilitating more garment storage than, e.g., loose bags of garments.

Once on the truck, the rack cart 10 is transported to a remote laundering facility. There, the rack is unloaded from the truck (again, via hand or by forklift), wheeled to a sorting location, and the zippered front panel is opened. Subsequently, the soiled garments are sorted, laundered, and otherwise processed, and the rack is cleaned and decontaminated, if needed. Then, clean, dry, folded, sorted garments are placed back in the rack, the front panel is closed, and the rack is transported back to the industrial facility.

Once back at the industrial facility, the rack is wheeled back to the changing location, where the casters 24 are locked, securing the rack in place. The front panel is unzipped and moved out of the way, revealing the garments, and the rack is left in place to act as a stationary shelf. When workers need clean garments, they are simply removed from the rack until it is empty, at which time it can be used to hold and carry soiled garments. The rack system 10 can also be used to carry soiled garments in bags, which simply sit on the shelves.

While the components of the wire rack system have been illustrated as being made of various materials, one of ordinary skill in the art will appreciate that materials other than those mentioned could be used as well, without departing from the spirit and scope of the invention, as long as they were sufficient for heavy industrial use and were suited for easy decontamination.

Also, although the wire rack system has been illustrated as having wire mesh matrices, or panels for partially enclosing the shelves, one of ordinary skill in the art will appreciate that fabric panels could be used instead without departing from the spirit and scope of the invention.

Additionally, although the wire rack system has been illustrated as having a fabric cover for closing the rack system during transportation, one of ordinary skill in the art will appreciate that wire mesh doors (or other types of doors) could be used instead. However, it should be noted that a fabric cover decreases weight, may be easier to decontaminate, and is less "in the way" after being opened.

Since certain changes may be made in the above-described wheel-mounted, wire rack system for shipping, storage, and delivery, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A method of shipping, storing, and delivering environmental garments to a workplace in a nuclear facility comprising the steps of:
   a. storing clean garments in a cart, said cart comprising:
      i. a base comprising a wheeled frame and a pair of forklift guides attached to an underside of the wheeled frame;
      ii. a shelf unit comprising: a plurality of upright posts attached to a topside of the frame; a plurality of shelves attached to the posts; and a plurality of side panels attached to the posts and/or shelves so as to enclose side and rear portions of the shelf unit and thereby define front openings for accessing the shelves;
      iii. a plurality of storage bins positioned on the shelves and configured to hold garments in an organized manner; and iv. at least one cover configured to selectively cover the shelf front openings;
b. transporting the cart from a remote laundry facility to the workplace in the nuclear facility;
c. opening the at least one cover to enable access to the shelves and stored clean garments;
d. storing soiled garments in the cart;
e. securely closing the at least one cover to cover the shelf front openings and secure the soiled garments in the cart;
f. transporting the cart from the workplace to the remote laundry facility;
g. opening the at least one cover to enable access to the shelves and stored soiled garments; and
h. removing the soiled garments from the rack for laundering; and
i. subsequent to removing the soiled garments from the rack for laundering, decontaminating the cart.

2. The method of claim 1 wherein: the step of transporting the cart from a remote laundry facility to a workplace and the step of transporting the cart from the workplace to the remote laundry facility is done by truck; and the method further comprises the steps of loading and unloading the cart from the truck using a forklift and the pair of forklift guides attached to the underside of the wheeled frame.

* * * * *